US012608107B2

(12) United States Patent
Chang et al.

(10) Patent No.: US 12,608,107 B2
(45) Date of Patent: Apr. 21, 2026

(54) COMPENSATION CIRCUIT AND METHOD FOR CANCELLING NOISE COUPLED TO TOUCH SENSING CIRCUIT

(71) Applicant: HIMAX TECHNOLOGIES LIMITED, Tainan City (TW)

(72) Inventors: Yaw-Guang Chang, Tainan City (TW);
Jia-Ming He, Tainan City (TW);
Chun-Yi Wu, Tainan City (TW)

(73) Assignee: HIMAX TECHNOLOGIES LIMITED, Tainan City (TW)

( * ) Notice: Subject to any disclaimer, the term of this patent is extended or adjusted under 35 U.S.C. 154(b) by 0 days.

(21) Appl. No.: 19/063,235

(22) Filed: Feb. 25, 2025

(65) Prior Publication Data

US 2026/0093360 A1 Apr. 2, 2026

Related U.S. Application Data

(60) Provisional application No. 63/700,765, filed on Sep. 30, 2024.

(51) Int. Cl.
*G06F 3/041* (2006.01)
*G06F 3/044* (2006.01)
*G09G 3/20* (2006.01)

(52) U.S. Cl.
CPC ........ *G06F 3/04184* (2019.05); *G06F 3/0412* (2013.01); *G09G 3/2007* (2013.01); *G09G 3/2096* (2013.01); *G06F 3/04162* (2019.05); *G06F 3/0442* (2019.05); *G06F 2203/04107* (2013.01); *G09G 2320/0233* (2013.01); *G09G 2354/00* (2013.01)

(58) Field of Classification Search
CPC .... G06F 3/041; G06F 3/0412; G06F 3/04162; G06F 3/04184; G06F 3/0442; G06F 2203/04107; G09G 3/2007; G09G 3/2096; G09G 2320/0233; G09G 2354/00
See application file for complete search history.

(56) References Cited

U.S. PATENT DOCUMENTS

2013/0241873 A1* 9/2013 Kim ..................... G02F 1/13338
345/173
2021/0397327 A1* 12/2021 Lee ....................... G06F 3/0412
2023/0050409 A1 2/2023 Lee

FOREIGN PATENT DOCUMENTS

KR 20220071653 A 5/2022

* cited by examiner

*Primary Examiner* — Cory A Almeida
(74) *Attorney, Agent, or Firm* — CKC & Partners Co., LLC

(57) ABSTRACT

A compensation circuit includes a computing processor, a DAC, and an amplifier circuit. The computing processor averages first digital codes to generate a first average digital code and averages second digital codes to generate a second average digital code. The second digital codes correspond to grayscale voltages provided from a source driver to pixels connected to a currently driven gate line. The first digital codes correspond to grayscale voltages provided from the source driver to pixels connected to a previously driven gate line. The DAC converts the first average digital code into a first voltage and converts the second average digital code into a second voltage, thereby generating a compensation signal transiting from the second voltage to the first voltage. The amplifier circuit generates an inverse noise signal according to the compensation signal and applies the inverse noise signal to an input terminal of the touch sensing circuit.

14 Claims, 9 Drawing Sheets

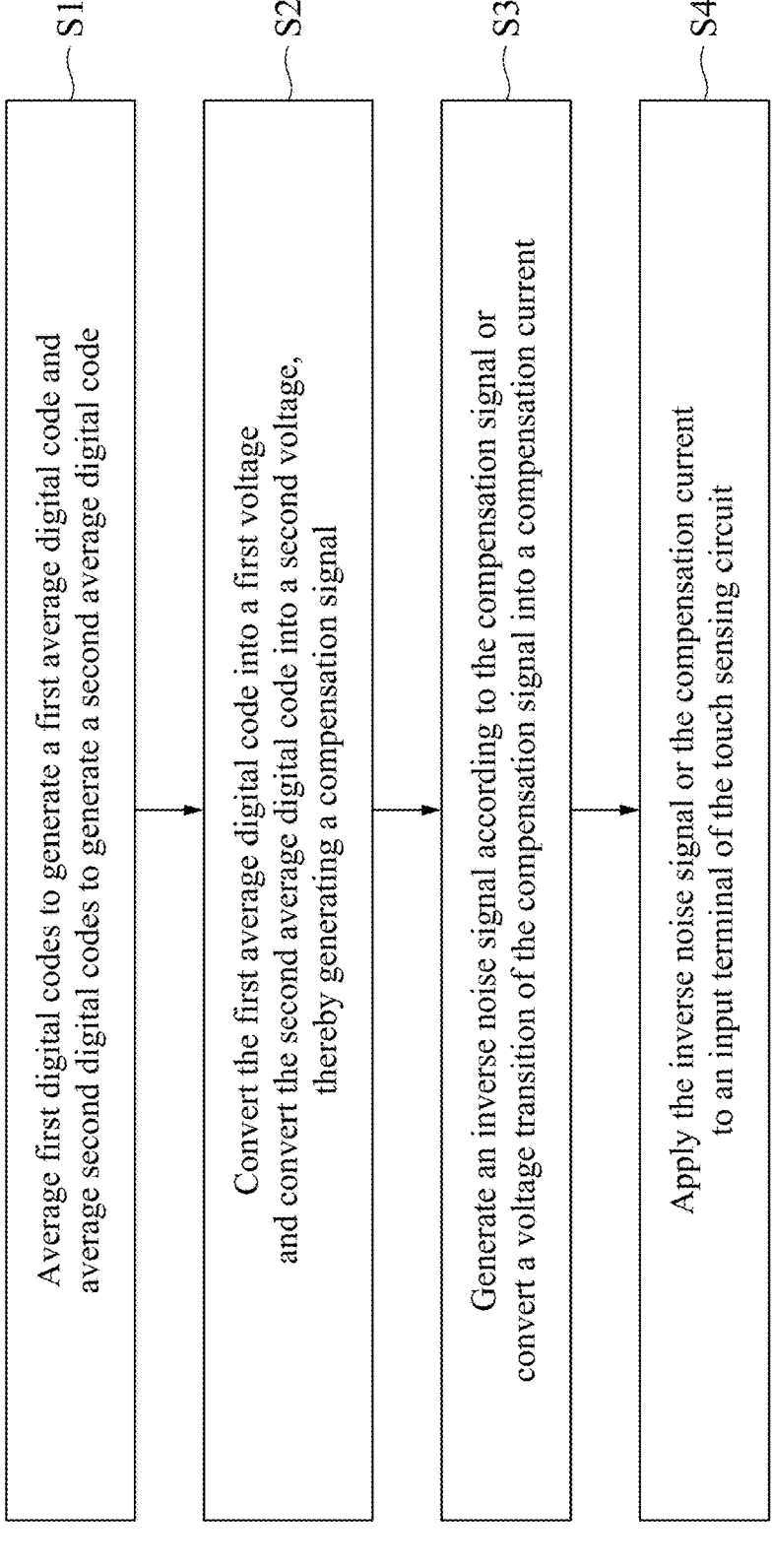

1000

S1 — Average first digital codes to generate a first average digital code and average second digital codes to generate a second average digital code S2 — Convert the first average digital code into a first voltage and convert the second average digital code into a second voltage, thereby generating a compensation signal S3 — Generate an inverse noise signal according to the compensation signal or convert a voltage transition of the compensation signal into a compensation current S4 — Apply the inverse noise signal or the compensation current to an input terminal of the touch sensing circuit

FIG. 9

COMPENSATION CIRCUIT AND METHOD FOR CANCELLING NOISE COUPLED TO TOUCH SENSING CIRCUIT

CROSS-REFERENCE TO RELATED APPLICATION

This application claims priority to U.S. Provisional Application Ser. No. 63/700,765, filed Sep. 30, 2024, which is herein incorporated by reference.

BACKGROUND

Field of Invention

The present disclosure relates to a compensation circuit and a compensation method. More particularly, the present disclosure relates to a compensation circuit and a compensation method for cancelling noise coupled to a touch sensing circuit.

Description of Related Art

As electronic products become thinner and lighter, a distance between a touch circuit and a display panel becomes closer, and thus the parasitic capacitance between the touch circuit and the display panel also increases, such that the touch sensing signal of the touch circuit is more susceptible to be interfered by the noise induced by the display panel through the parasitic capacitance. For example, the parasitic capacitance between the flexible AMOLED panel and the touch circuit may reach 500 pF or 1000 pF, and therefore the touch sensing signal is severely interfered when the flexible AMOLED panel is switched.

SUMMARY

The present disclosure provides a compensation circuit for cancelling noise coupled to a touch sensing circuit. The compensation circuit includes a computing processor, a digital-to-analog converter (DAC), and an amplifier circuit. The computing processor is configured to average first digital codes to generate a first average digital code and average second digital codes to generate a second average digital code. The second digital codes correspond to grayscale voltages provided from a source driver to pixels connected to a currently driven gate line. The first digital codes correspond to grayscale voltages provided from the source driver to pixels connected to a previously driven gate line adjacent to the currently driven gate line. The DAC is coupled to the computing processor to convert the first average digital code into a first voltage and convert the second average digital code into a second voltage, thereby generating a compensation signal transiting from the second voltage to the first voltage. The amplifier circuit is coupled to the DAC to generate an inverse noise signal according to the compensation signal and apply the inverse noise signal to an input terminal of the touch sensing circuit.

In accordance with one or more embodiments of the present disclosure, the amplifier circuit applies the inverse noise signal to the input terminal of the touch sensing circuit through a compensation capacitor coupled between the amplifier circuit and the input terminal of the touch sensing circuit.

In accordance with one or more embodiments of the present disclosure, the amplifier circuit is a buffer amplifier and the inverse noise signal is equal to the compensation signal.

In accordance with one or more embodiments of the present disclosure, a capacitance of the compensation capacitor is equal to a capacitance of a coupled capacitor coupled between the input terminal of the touch sensing circuit and a voltage supply line of the pixels of a display panel.

In accordance with one or more embodiments of the present disclosure, a product of a capacitance of the compensation capacitor and a voltage transition of the inverse noise signal is equal to a product of a capacitance of a coupled capacitor and a difference between the second voltage and the first voltage, wherein the coupled capacitor is coupled between the input terminal of the touch sensing circuit and a voltage supply line of the pixels of a display panel.

In accordance with one or more embodiments of the present disclosure, the touch sensing circuit is configured to sense a touch cause by an active pen.

In accordance with one or more embodiments of the present disclosure, the computing processor receives the first digital codes and the second digital codes from a display IC via a communication interface.

In accordance with one or more embodiments of the present disclosure, the computing processor receives the first digital codes and the second digital codes from a timing controller of a display panel via a communication interface.

The present disclosure further provides a compensation circuit for cancelling noise coupled to a touch sensing circuit. The compensation circuit includes a computing processor, a DAC, and a voltage-to-current converting circuit. The computing processor is configured to average first digital codes to generate a first average digital code and average second digital codes to generate a second average digital code. The second digital codes correspond to grayscale voltages provided from a source driver to pixels connected to a currently driven gate line. The first digital codes correspond to grayscale voltages provided from the source driver to pixels connected to a previously driven gate line adjacent to the currently driven gate line. The DAC is coupled to the computing processor to convert the first average digital code into a first voltage and convert the second average digital code into a second voltage, thereby generating a compensation signal transiting from the second voltage to the first voltage. The voltage-to-current converting circuit is coupled to the DAC to convert a voltage transition of the compensation signal into a compensation current and apply the compensation current to an input terminal of the touch sensing circuit.

In accordance with one or more embodiments of the present disclosure, the voltage-to-current converting circuit includes a voltage-to-current converter, a current source, and a switch. The voltage-to-current converter is coupled to the DAC to receive the compensation signal and convert the compensation signal into an instruction signal corresponding to the compensation current. The current source is coupled between the voltage-to-current converter to receive the instruction signal and thus generate the compensation current applied to the input terminal of the touch sensing circuit. The switch is coupled to the current source and controlled to determine a duration that the compensation current is applied to the input terminal of the touch sensing circuit.

In accordance with one or more embodiments of the present disclosure, a product of the duration and the compensation current is equal to a product of a capacitance of a coupled capacitor and a difference between the second voltage and the first voltage, wherein the coupled capacitor is coupled between the input terminal of the touch sensing circuit and a voltage supply line of the pixels of a display panel.

In accordance with one or more embodiments of the present disclosure, the touch sensing circuit is configured to sense a touch cause by an active pen.

In accordance with one or more embodiments of the present disclosure, the computing processor receives the first digital codes and the second digital codes from a display IC via a communication interface.

In accordance with one or more embodiments of the present disclosure, the computing processor receives the first digital codes and the second digital codes from a timing controller of a display panel via a communication interface.

The present disclosure yet provides a compensation method for cancelling noise coupled to a touch sensing circuit. The compensation method includes: averaging first digital codes to generate a first average digital code and averaging second digital codes to generate a second average digital code, in which the second digital codes correspond to grayscale voltages provided from a source driver to pixels connected to a currently driven gate line and the first digital codes correspond to grayscale voltages provided from the source driver to pixels connected to a previously driven gate line adjacent to the currently driven gate line; converting the first average digital code into a first voltage and converting the second average digital code into a second voltage, thereby generating a compensation signal transiting from the second voltage to the first voltage; generating an inverse noise signal according to the compensation signal or converting a voltage transition of the compensation signal into a compensation current; and applying the inverse noise signal or the compensation current to an input terminal of the touch sensing circuit.

In accordance with one or more embodiments of the present disclosure, the inverse noise signal is applied to the input terminal of the touch sensing circuit through a compensation capacitor.

In accordance with one or more embodiments of the present disclosure, the inverse noise signal is equal to the compensation signal and a capacitance of the compensation capacitor is equal to a capacitance of a coupled capacitor coupled between the input terminal of the touch sensing circuit and a voltage supply line of the pixels of a display panel.

In accordance with one or more embodiments of the present disclosure, a product of a capacitance of the compensation capacitor and a voltage transition of the inverse noise signal is equal to a product of a capacitance of a coupled capacitor and a difference between the second voltage and the first voltage, wherein the coupled capacitor is coupled between the input terminal of the touch sensing circuit and a voltage supply line of the pixels of a display panel.

In accordance with one or more embodiments of the present disclosure, the compensation method further includes: converting the compensation signal into an instruction signal corresponding to the compensation current; utilizing a current source to receive the instruction signal and thus generating the compensation current applied to the input terminal of the touch sensing circuit; and controlling a switch coupled to the current source to determine a duration that the compensation current is applied to the input terminal of the touch sensing circuit.

In accordance with one or more embodiments of the present disclosure, a product of the duration and the compensation current is equal to a product of a capacitance of a coupled capacitor and a difference between the second voltage and the first voltage, wherein the coupled capacitor is coupled between the input terminal of the touch sensing circuit and a voltage supply line of the pixels of a display panel.

In order to make the above features and advantages of the present disclosure more apparent and understandable, the following embodiments of the present disclosure, together with the accompanying drawings, are described in detail below.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 9 shows a flowchart of a compensation method according to some embodiments of the present disclosure.

DETAILED DESCRIPTION

Specific embodiments of the present disclosure are further described in detail below with reference to the accompanying drawings. However, the embodiments described are not intended to limit the present disclosure and it is not intended for the description of operations to limit the order of implementation. The terms "first" and "second" used in the specification should be understood as identifying units or data described by the same terminology, and do not refer to a particular order or sequence.

Figure 1:
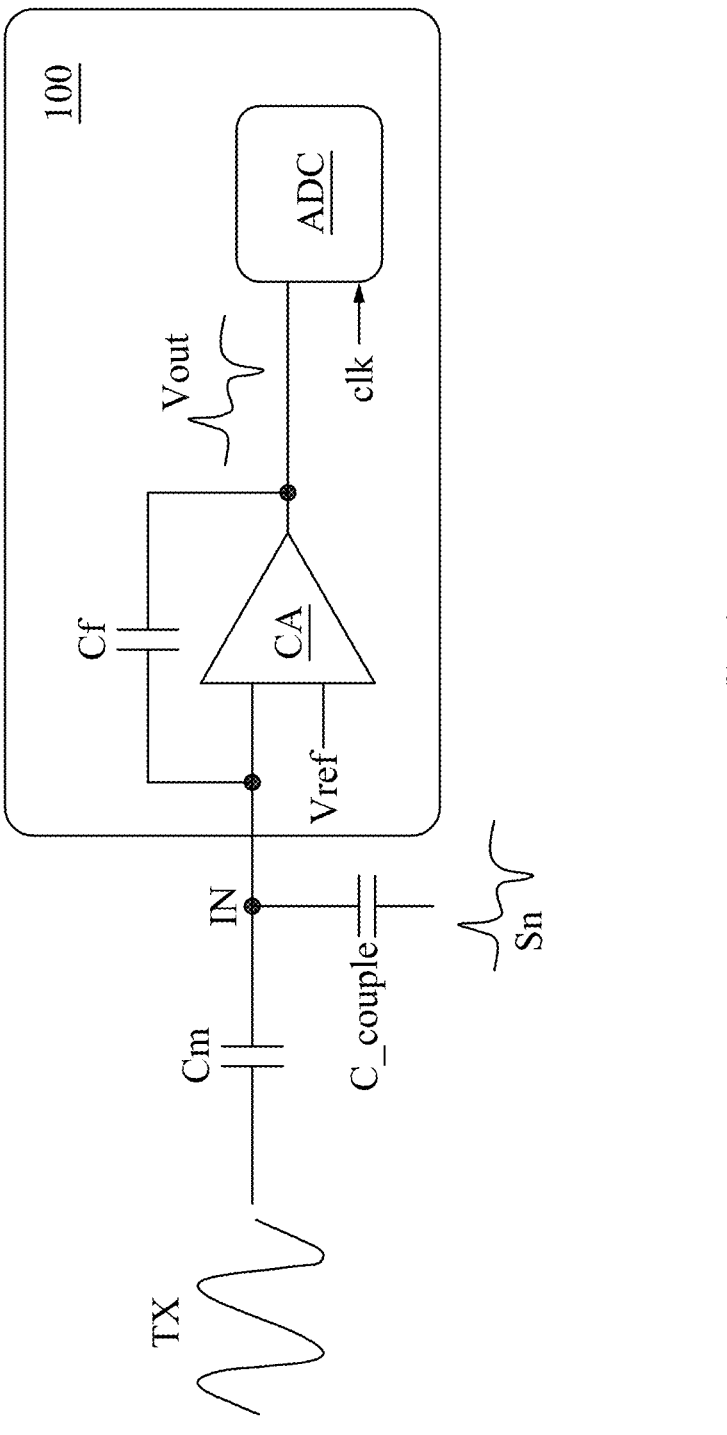
FIG. 1 is a circuit diagram for illustrating noise coupled to a touch sensing circuit.

FIG. 1 is a circuit diagram for illustrating a noise Sn coupled to a touch sensing circuit 100. The touch sensing circuit 100 includes a charge amplifier CA. An inverting input terminal of the charge amplifier CA receives a touch signal TX through a mutual capacitor Cm. A non-inverting input terminal of the charge amplifier CA receives a reference voltage Vref. A charge transferred through the mutual capacitor Cm is converted through a feedback capacitor Cf into an analog voltage Vout that is proportional to the mutual capacitance Cm. An analog-to-digital converter ADC converts the analog voltage Vout into a digital signal with a conversion clock clk. The digital signal corresponds to a touch detection result.

For example, an amplitude of peak-to-peak voltage of the touch signal TX is 5 volt, and a capacitance of the mutual capacitor Cm is 1 pF, and thus an amount of charge caused by the touch signal TX and generated at an input terminal IN of the touch sensing circuit 100 is 1 pF*5 volt=5 pC. For example, an amplitude of peak-to-peak voltage of the noise Sn is 0.1 volt, and a capacitance of a coupled capacitor C_couple is 500 pF, and thus an amount of charge caused by the noise Sn and generated at the input terminal IN of the touch sensing circuit 100 is 500 pF*0.1 volt=50 pC which is much larger than 5 pC. Therefore, a precision of touch detection of the touch sensing circuit 100 is severely interfered.

Figure 2:
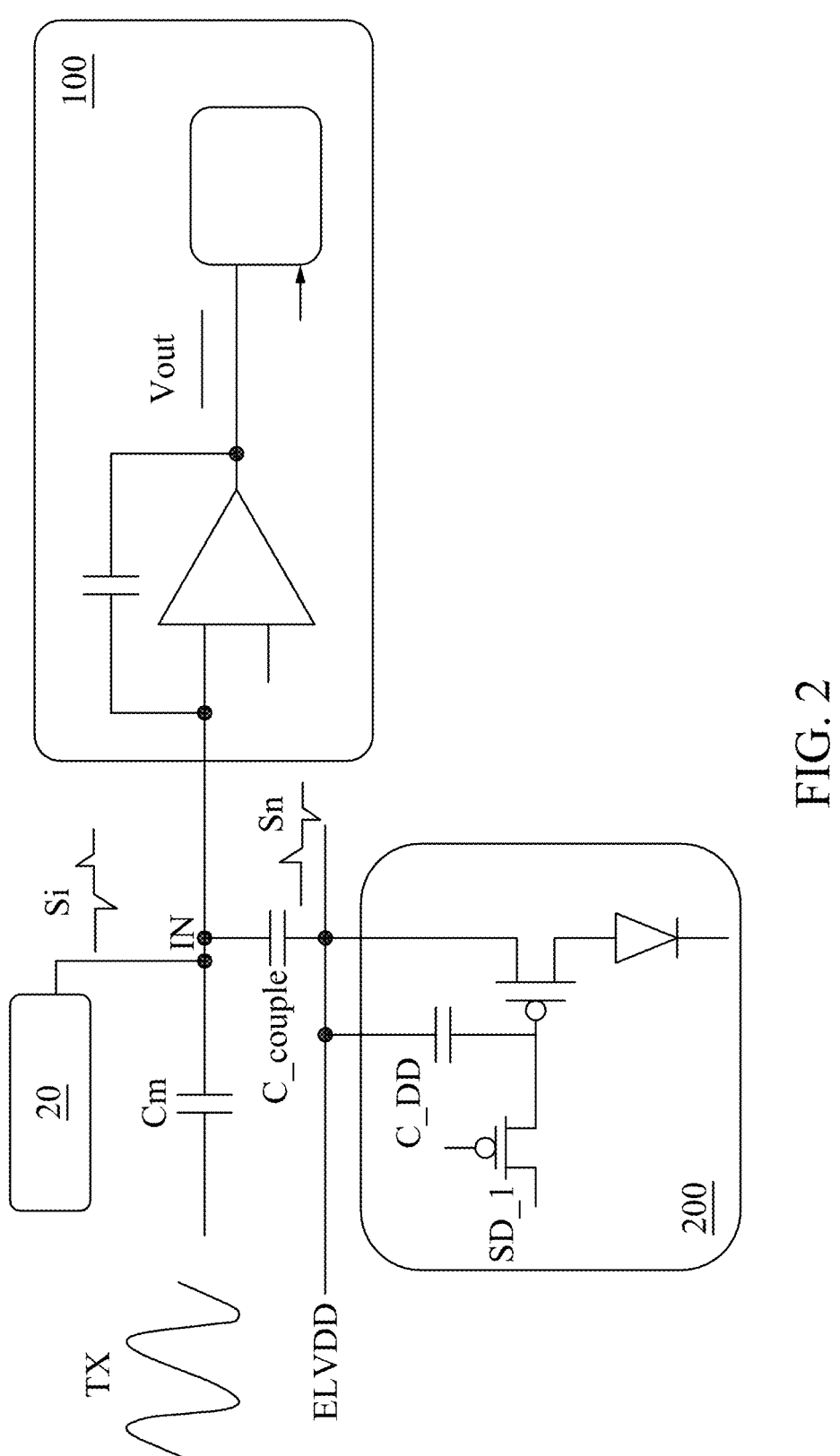
FIG. 2 is a circuit diagram showing a concept of the present disclosure for cancelling the noise coupled to the touch sensing circuit.

FIG. 2 is a circuit diagram showing a concept of the present disclosure for cancelling the noise Sn coupled to the touch sensing circuit 100. An OLED pixel circuit 200 is coupled to a voltage supply line ELVDD of a display panel. When the OLED pixel circuit 200 is switched, the source driver connected to the OLED pixel circuit 200 charges a storage capacitor C_DD through a source driver signal SD_1. A voltage transition caused by the aforementioned charged process is coupled to the voltage supply line ELVDD through the storage capacitor C_DD, thereby generating the noise Sn superposed on a supply voltage of the voltage supply line ELVDD.

The present disclosure proposes a compensation circuit 20 to cancel interference caused by the noise Sn. As shown in FIG. 2, the compensation circuit 20 generates an inverse signal Si of the noise Sn according to the aforementioned voltage transition. The inverse signal Si and the noise Sn are both transmitted at the input terminal IN of the touch sensing circuit 100, and thus the noise Sn can be cancelled by the inverse signal Si. This approach can prevent the touch sensing circuit 100 from being interfered by the noise Sn, and the EMI effect is also improved.

It should be noted that, in fact, the noise generated on the voltage supply line is caused by plural OLED pixels connected to different gate lines. When the display panel is switched, grayscale voltages provided from a source driver to OLED pixels connected to a currently driven gate line are different from grayscale voltages provided from the source driver to OLED pixels connected to a previously driven gate line. Specifically, the noise Sn corresponds to a voltage transition from a first voltage to a second voltage. The first voltage is an average of the grayscale voltages provided from the source driver to OLED pixels connected to a currently driven gate line, and the second voltage is an average of the grayscale voltages provided from the source driver to OLED pixels connected to a previously driven gate line.

Figure 3:
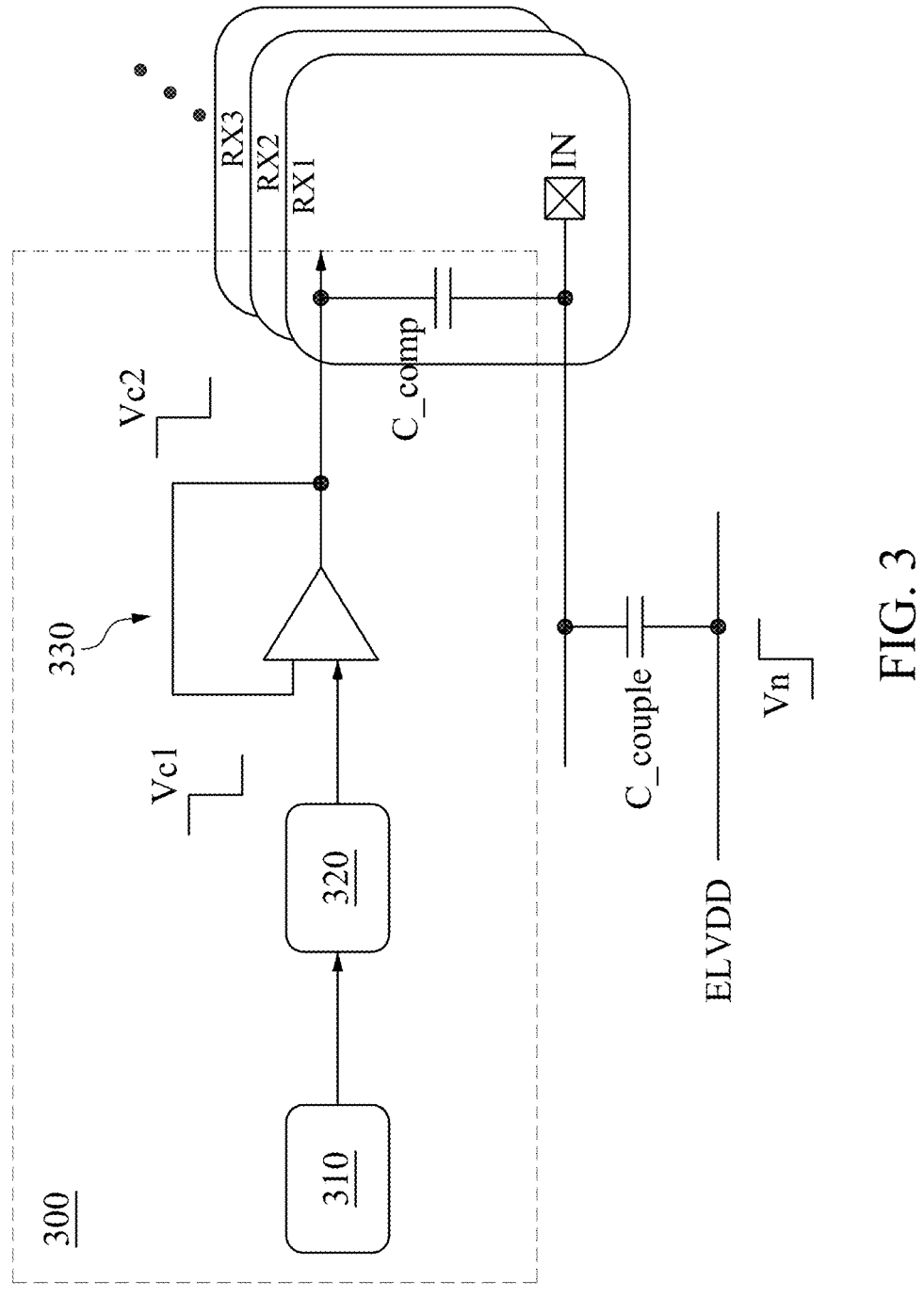
FIG. 3 shows a circuit diagram of a compensation circuit according to a first embodiment of the present disclosure.

FIG. 3 shows a circuit diagram of a compensation circuit 300 according to a first embodiment of the present disclosure. The compensation circuit 300 includes a computing processor 310, a digital-to-analog converter (DAC) 320, and an amplifier circuit 330.

The computing processor 310 is utilized to average first digital codes to generate a first average digital code and average second digital codes to generate a second average digital code. The second digital codes correspond to grayscale voltages provided from a source driver to pixels connected to a currently driven gate line. The first digital codes correspond to grayscale voltages provided from the source driver to pixels connected to a previously driven gate line adjacent to the currently driven gate line. The computing processor 310 receives the first digital codes and the second digital codes from the touch panel, the touch IC, the source driver or the timing controller. Specifically, the source driver outputs the grayscale voltage to a selected pixel according to the digital code corresponding to the selected pixel.

The DAC 320 is coupled to the computing processor 310 to convert the first average digital code into a first voltage and convert the second average digital code into a second voltage, thereby generating a compensation signal Vc1 transiting from the second voltage to the first voltage. In contrast to the compensation signal Vc1, a noise signal Vn superposed on a supply voltage of the voltage supply line ELVDD is a signal transiting from the first voltage to the second voltage.

The amplifier circuit 330 is coupled to the DAC 320 to generate an inverse noise signal Vc2 according to the compensation signal Vc1 and apply the inverse noise signal Vc2 to the input terminal IN of the touch sensing circuit. As shown in FIG. 3, the amplifier circuit 330 applies the inverse noise signal Vc2 to the input terminal IN of the touch sensing circuit through a compensation capacitor C_comp coupled between the amplifier circuit 330 and the input terminal IN of the touch sensing circuit.

In order to cancel interference caused by the noise Sn, at the input terminal IN of the touch sensing circuit, an amount of charge caused by the inverse noise signal Vc2 is required to be equal to an amount of charge caused by the noise signal Vn. In order words, according to an equation of electrical charge, a product of a capacitance of the compensation capacitor C_comp and a voltage transition of the inverse noise signal Vc2 is equal to a product of a capacitance of a coupled capacitor C_couple and a difference between the second voltage and the first voltage. The coupled capacitor C_couple is coupled between the input terminal IN of the touch sensing circuit and a voltage supply line ELVDD of the pixels of a display panel.

As shown in FIG. 3, the amplifier circuit 330 is a buffer amplifier and thus the inverse noise signal Vc2 is equal to the compensation signal Vc1, but the present disclosure is not limited thereto. As described above, an amount of charge caused by the inverse noise signal Vc2 is required to be equal to an amount of charge caused by the noise signal Vn, and thus in a case that the amplifier circuit 330 is a buffer amplifier, a capacitance of the compensation capacitor C_comp is equal to a capacitance of the coupled capacitor C_couple.

As shown in FIG. 3, the compensation circuit 300 is implemented on all of the touch sensing circuits labelled as RX1, RX2, and RX3, etc. Each of the touch sensing circuits RX1, RX2, and RX3 includes the compensation capacitor C_comp.

Figure 4:
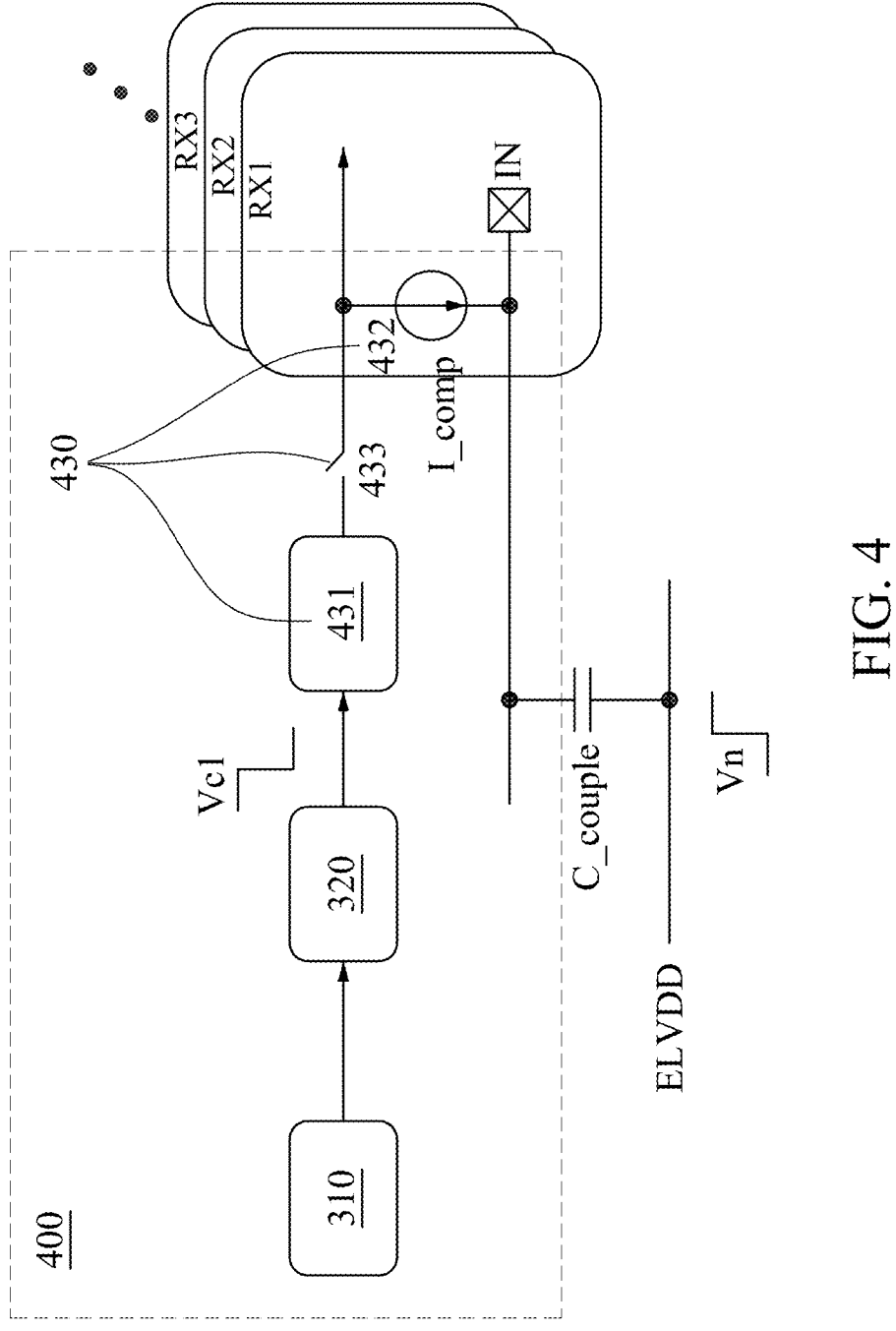
FIG. 4 shows a circuit diagram of a compensation circuit 400 according to a second embodiment of the present disclosure.

FIG. 4 shows a circuit diagram of a compensation circuit 400 according to a second embodiment of the present disclosure. The compensation circuit 400 includes the computing processor 310, the DAC 320, and a voltage-to-current converting circuit 430.

The computing processor 310 is utilized to average the first digital codes to generate the first average digital code and average the second digital codes to generate the second average digital code. The second digital codes correspond to the grayscale voltages provided from the source driver to the pixels connected to the currently driven gate line. The first digital codes correspond to the grayscale voltages provided from the source driver to the pixels connected to the previously driven gate line adjacent to the currently driven gate line.

The DAC 320 is coupled to the computing processor 310 to convert the first average digital code into the first voltage and convert the second average digital code into the second voltage, thereby generating the compensation signal Vc1 transiting from the second voltage to the first voltage. In contrast to the compensation signal Vc1, the noise signal Vn superposed on the supply voltage of the voltage supply line ELVDD is the signal transiting from the first voltage to the second voltage.

The voltage-to-current converting circuit 430 is coupled to the DAC 320 to convert a voltage transition of the compensation signal Vc1 into a compensation current I_comp and apply the compensation current I_comp to the input terminal IN of the touch sensing circuit.

As shown in FIG. 4, the voltage-to-current converting circuit 430 includes a voltage-to-current converter 431, a current source 432, and a switch 433. The voltage-to-current converter 431 is coupled to the DAC 320 to receive the compensation signal Vc1 and convert the compensation signal Vc1 into an instruction signal corresponding to the compensation current I_comp. The current source 432 is coupled between the voltage-to-current converter 431 to receive the instruction signal and thus generate the compensation current I_comp applied to the input terminal IN of the touch sensing circuit. The switch 433 is coupled to the current source 432 and controlled to determine a duration that the compensation current I_comp is applied to the input terminal IN of the touch sensing circuit. Specifically, the voltage-to-current converting circuit 430 controls the switch 433 to determine the duration that the compensation current I_comp is applied to the input terminal IN of the touch sensing circuit.

In order to cancel interference caused by the noise Sn, at the input terminal IN of the touch sensing circuit, an amount of charge caused by the compensation current I_comp is required to be equal to an amount of charge caused by the noise signal Vn. In order words, according to an equation of electrical charge, a product of the compensation current I_comp and the duration that the compensation current I_comp is applied to the input terminal IN of the touch sensing circuit is equal to a product of a capacitance of the coupled capacitor C_couple and a difference between the second voltage and the first voltage. The coupled capacitor C_couple is coupled between the input terminal IN of the touch sensing circuit and a voltage supply line ELVDD of the pixels of a display panel.

As shown in FIG. 4, the compensation circuit 400 is implemented on all of the touch sensing circuits labelled as RX1, RX2, and RX3, etc. Each of the touch sensing circuits RX1, RX2, and RX3 includes the current source 432.

Figure 5:
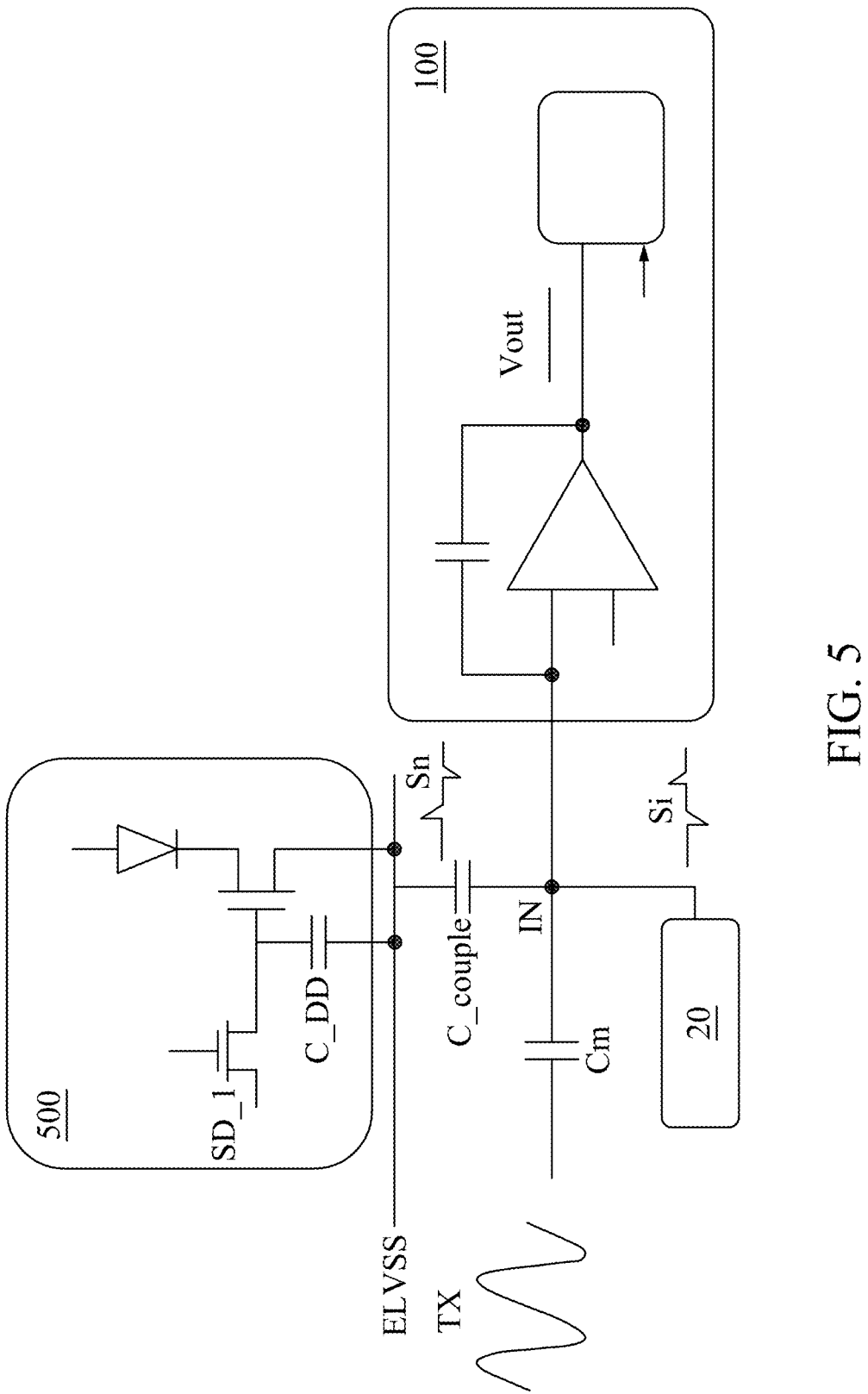
FIG. 5 is a circuit diagram showing a concept of the present disclosure for cancelling the noise coupled to the touch sensing circuit.

In another embodiment of the present disclosure, the aforementioned voltage supply line may be replaced with ELVSS. As shown in FIG. 5, when an OLED pixel circuit 500 is composed of NMOS transistors, the OLED pixel circuit 500 is coupled to a voltage supply line ELVSS of a display panel. When the OLED pixel circuit 500 is switched, the source driver connected to the OLED pixel circuit 500 charges a storage capacitor C_DD through a source driver signal SD_1. A voltage transition caused by the aforementioned charged process is coupled to the voltage supply line ELVSS through the storage capacitor C_DD, thereby generating the noise Sn superposed on a supply voltage of the voltage supply line ELVSS.

The compensation circuit 20 generates the inverse signal Si of the noise Sn according to the aforementioned voltage transition. The inverse signal Si and the noise Sn are both transmitted at the input terminal IN of the touch sensing circuit 100, and thus the noise Sn can be cancelled by the inverse signal Si. Specifically, the inverse signal Si or the compensation current I_comp can be applied at a node coupled to the voltage supply line ELVDD, the voltage supply line ELVSS, a gate driver high voltage supply line VGHO, a gate driver low voltage supply line VGLO, or an output terminal TX of a touch driving circuit, thereby cancelling the noise coupled to the input terminal of the touch sensing circuit.

In some embodiments of the present disclosure, the touch sensing circuit is configured to sense a touch cause by an active pen or a finger. In other words, the touch signal TX is generated by the active pen or a touch event from the finger.

Figure 6:
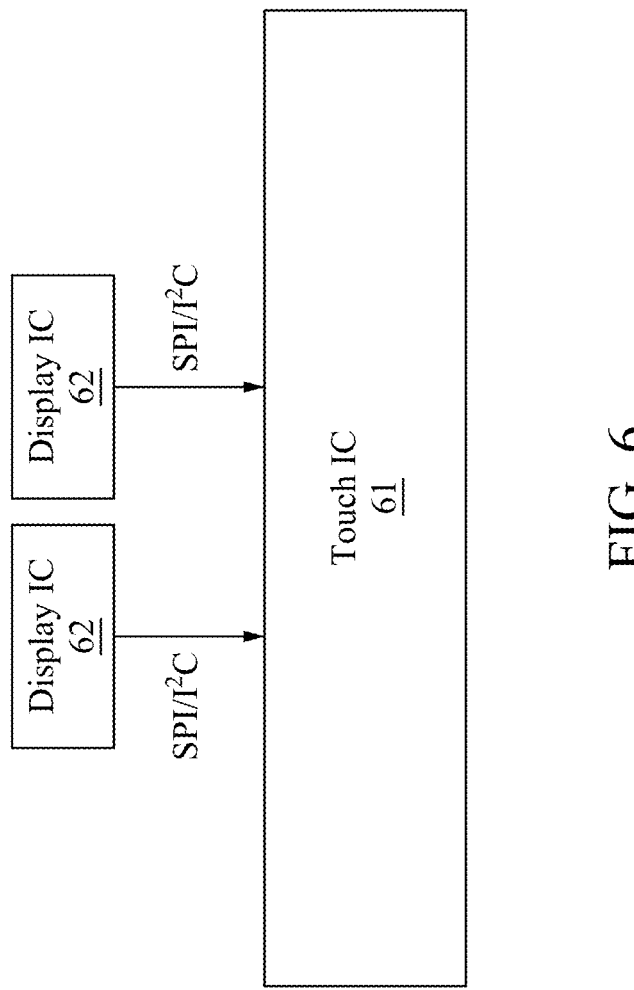
FIG. 6 is a circuit diagram for illustrating a case that the computing processor receives the digital codes from the display IC.

In a case that the computing processor receives the first digital codes and the second digital codes from the display IC, as shown in FIG. 6, a touch IC 61 and two display ICs 62 are independent. The computing processor of the touch IC 61 receives the first digital codes and the second digital codes from the one of the display ICs 62 via a communication interface, such as a serial peripheral interface (SPI) or an inter-integrated circuit (I²C) interface.

Figure 7:
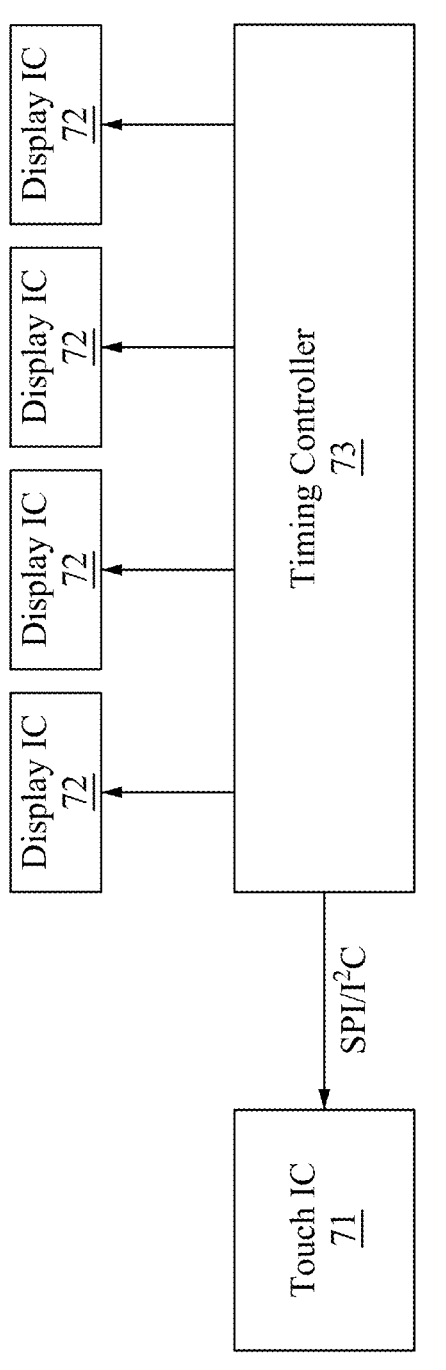
FIG. 7 is a circuit diagram for illustrating a case that the computing processor receives the digital codes from the timing controller.

In a case that the computing processor receives the first digital codes and the second digital codes from the timing controller, as shown in FIG. 7, there are several display ICs 72 forming a cascade structure. The computing processor of a touch IC 71 directly receives the first digital codes and the second digital codes from the timing controller 73 via a communication interface, such as the SPI interface or the I²C interface. The timing controller 73 further transmits the first digital codes and the second digital codes to the display ICs 72. Specifically, when the display panel is large-size panel, the number of the display ICs 72 is larger, so the digital codes can be transmitted by the timing controller 73 instead of the display ICs 72, thereby reducing the number of connecting lines between the display ICs 72 and touch IC 71.

Figure 8:
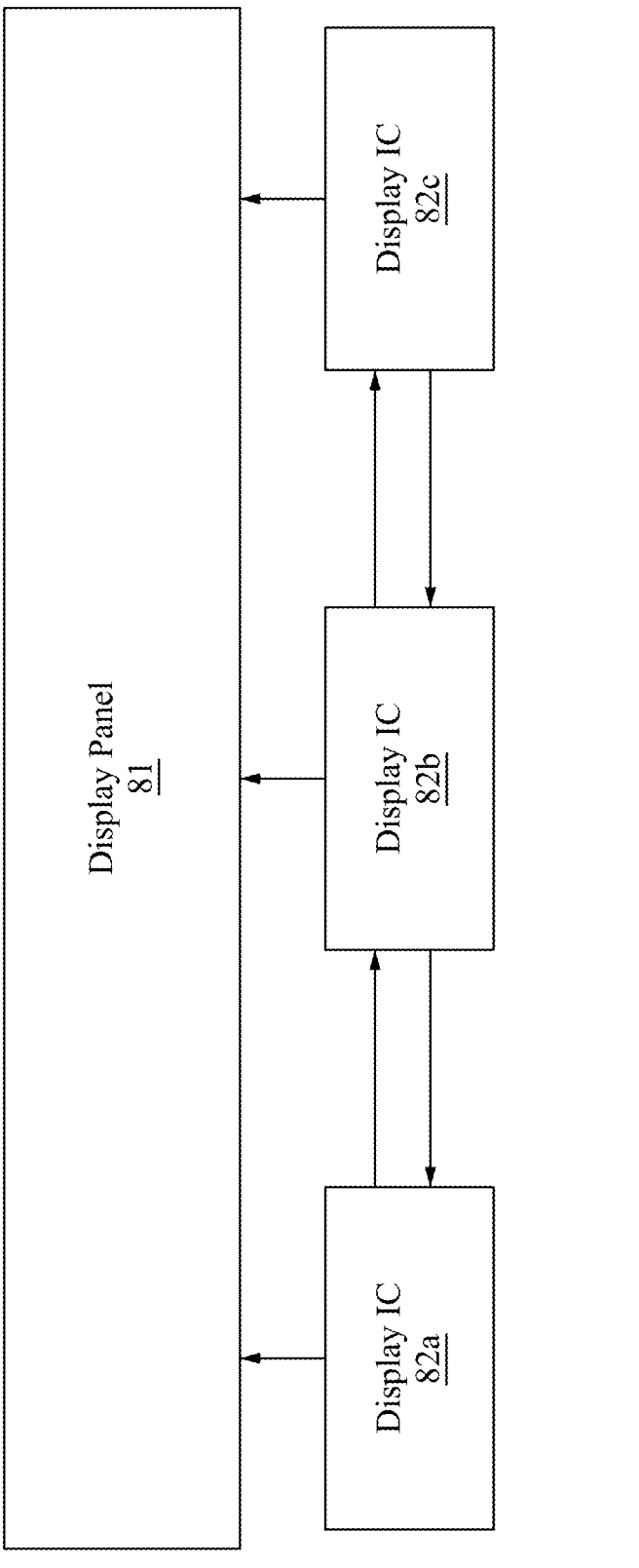
FIG. 8 is a circuit diagram for illustrating a case that the present disclosure is applied to the touch with display driver integration (TDDI) technology.

In a case of TDDI, as shown in FIG. 8, there are several display ICs 82a, 82b, 82c forming a cascade structure. Because the present disclosure needs to obtain the average digital code from all of these display ICs 82a, 82b, 82c, each of the display ICs computes a self-average digital code and these self-average digital codes are transmitted to a main display IC (i.e., the display IC 82b) as shown in FIG. 8. Then, the main display IC (i.e., the display IC 82b) computes the average digital code of these display ICs 82a, 82b, 82c, and the main display IC (i.e., the display IC 82b) transmits the average digital code to the display ICs 82a and 82c. Therefore, the compensation circuit of the present disclosure can utilized this average digital code to cancel noise coupled to the touch sensing circuit.

FIG. 9 shows a flowchart of a compensation method 1000 according to some embodiments of the present disclosure. In Step S1, the computing processor 310 is utilized to average first digital codes to generate a first average digital code and average second digital codes to generate a second average digital code. In Step S2, the DAC 320 is utilized to convert the first average digital code into a first voltage and convert the second average digital code into a second voltage, thereby generating the compensation signal Vc1 transiting from the second voltage to the first voltage. In Step S3, the amplifier circuit 330 is utilized to generate an inverse noise signal Vc2 according to the compensation signal Vc1 or the voltage-to-current converting circuit 430 is utilized to convert a voltage transition of the compensation signal Vc1 into a compensation current I_comp. In Step S4, the amplifier circuit 330 is utilized to apply the inverse noise signal Vc2 to the input terminal IN of the touch sensing circuit or the voltage-to-current converting circuit 430 is utilized to apply the compensation current I_comp to the input terminal IN of the touch sensing circuit.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims.

What is claimed is:

1. A compensation circuit for cancelling noise coupled to a touch sensing circuit, the compensation circuit comprising:

a computing processor configured to average first digital codes to generate a first average digital code and average second digital codes to generate a second average digital code, wherein the second digital codes correspond to grayscale voltages provided from a source driver to pixels connected to a currently driven gate line, wherein the first digital codes correspond to grayscale voltages provided from the source driver to pixels connected to a previously driven gate line adjacent to the currently driven gate line;

a digital-to-analog converter (DAC) coupled to the computing processor to convert the first average digital code into a first voltage and convert the second average digital code into a second voltage, thereby generating a compensation signal transiting from the second voltage to the first voltage; and an amplifier circuit coupled to the DAC to generate an inverse noise signal according to the compensation signal and apply the inverse noise signal to an input terminal of the touch sensing circuit;

wherein the amplifier circuit applies the inverse noise signal to the input terminal of the touch sensing circuit through a compensation capacitor coupled between the amplifier circuit and the input terminal of the touch sensing circuit;

wherein a product of a capacitance of the compensation capacitor and a voltage transition of the inverse noise signal is equal to a product of a capacitance of a coupled capacitor and a difference between the second voltage and the first voltage, wherein the coupled capacitor is coupled between the input terminal of the touch sensing circuit and a voltage supply line of the pixels of a display panel.

2. The compensation circuit of claim 1, wherein the amplifier circuit is a buffer amplifier and the inverse noise signal is equal to the compensation signal.

3. The compensation circuit of claim 1, wherein the capacitance of the compensation capacitor is equal to the capacitance of the coupled capacitor.

4. The compensation circuit of claim 1, wherein the touch sensing circuit is configured to sense a touch caused by an active pen.

5. The compensation circuit of claim 1, wherein the computing processor receives the first digital codes and the second digital codes from a display IC via a communication interface.

6. The compensation circuit of claim 1, wherein the computing processor receives the first digital codes and the second digital codes from a timing controller of the display panel via a communication interface.

7. A compensation circuit for cancelling noise coupled to a touch sensing circuit, the compensation circuit comprising:

a computing processor configured to average first digital codes to generate a first average digital code and average second digital codes to generate a second average digital code, wherein the second digital codes correspond to grayscale voltages provided from a source driver to pixels connected to a currently driven gate line, wherein the first digital codes correspond to grayscale voltages provided from the source driver to pixels connected to a previously driven gate line adjacent to the currently driven gate line;

a digital-to-analog converter (DAC) coupled to the computing processor to convert the first average digital code into a first voltage and convert the second average digital code into a second voltage, thereby generating a compensation signal transiting from the second voltage to the first voltage; and a voltage-to-current converting circuit coupled to the DAC to convert a voltage transition of the compensation signal into a compensation current and apply the compensation current to an input terminal of the touch sensing circuit, wherein the voltage-to-current converting circuit comprises:

a voltage-to-current converter coupled to the DAC to receive the compensation signal and convert the compensation signal into an instruction signal corresponding to the compensation current;

a current source coupled between the voltage-to-current converter to receive the instruction signal and thus generate the compensation current applied to the input terminal of the touch sensing circuit; and a switch coupled to the current source and controlled to determine a duration that the compensation current is applied to the input terminal of the touch sensing circuit;

wherein a product of the duration and the compensation current is equal to a product of a capacitance of a coupled capacitor and a difference between the second voltage and the first voltage, wherein the coupled capacitor is coupled between the input terminal of the touch sensing circuit and a voltage supply line of the pixels of a display panel.

8. The compensation circuit of claim 7, wherein the touch sensing circuit is configured to sense a touch caused by an active pen.

9. The compensation circuit of claim 7, wherein the computing processor receives the first digital codes and the second digital codes from a display IC via a communication interface.

10. The compensation circuit of claim 7, wherein the computing processor receives the first digital codes and the second digital codes from a timing controller of the display panel via a communication interface.

11. A compensation method for cancelling noise coupled to a touch sensing circuit, the compensation method comprising:

averaging first digital codes to generate a first average digital code and averaging second digital codes to generate a second average digital code, wherein the second digital codes correspond to grayscale voltages provided from a source driver to pixels connected to a currently driven gate line, wherein the first digital codes correspond to grayscale voltages provided from the source driver to pixels connected to a previously driven gate line adjacent to the currently driven gate line;

converting the first average digital code into a first voltage and converting the second average digital code into a second voltage, thereby generating a compensation signal transiting from the second voltage to the first voltage;

generating an inverse noise signal according to the compensation signal or converting a voltage transition of the compensation signal into a compensation current; and applying the inverse noise signal or the compensation current to an input terminal of the touch sensing circuit;

wherein the inverse noise signal is applied to the input terminal of the touch sensing circuit through a compensation capacitor;

wherein a product of a capacitance of the compensation capacitor and a voltage transition of the inverse noise signal is equal to a product of a capacitance of a coupled capacitor and a difference between the second voltage and the first voltage, wherein the coupled capacitor is coupled between the input terminal of the touch sensing circuit and a voltage supply line of the pixels of a display panel.

12. The compensation method of claim 11, wherein the inverse noise signal is equal to the compensation signal and the capacitance of the compensation capacitor is equal to the capacitance of the coupled capacitor.

13. The compensation method of claim 11, further comprising:

converting the compensation signal into an instruction signal corresponding to the compensation current;

utilizing a current source to receive the instruction signal and thus generating the compensation current applied to the input terminal of the touch sensing circuit; and controlling a switch coupled to the current source to determine a duration that the compensation current is applied to the input terminal of the touch sensing circuit.

14. The compensation method of claim 13, wherein a product of the duration and the compensation current is equal to a product of the capacitance of the coupled capacitor and a difference between the second voltage and the first voltage.

* * * * *